US009448667B2

(12) United States Patent
Hatano

(10) Patent No.: US 9,448,667 B2
(45) Date of Patent: Sep. 20, 2016

(54) COORDINATE DETECTING DEVICE

(75) Inventor: Naoyuki Hatano, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 656 days.

(21) Appl. No.: 13/529,301

(22) Filed: Jun. 21, 2012

(65) Prior Publication Data

US 2013/0002579 A1     Jan. 3, 2013

(30) Foreign Application Priority Data

Jun. 29, 2011  (JP) .................. 2011-144102

(51) Int. Cl.
*G06F 3/041* (2006.01)
*G06F 3/044* (2006.01)
*G06F 3/047* (2006.01)

(52) U.S. Cl.
CPC .............. *G06F 3/044* (2013.01); *G06F 3/047* (2013.01); *G06F 3/0418* (2013.01)

(58) Field of Classification Search
CPC ...... G06F 3/041; G06F 3/0412; G06F 3/044; G06F 3/04104
See application file for complete search history.

(56) References Cited

U.S. PATENT DOCUMENTS

| 8,564,546 B1* | 10/2013 | Birch .................... 345/173 |
| 2010/0289769 A1 | 11/2010 | Watanabe |
| 2010/0295810 A1* | 11/2010 | Nagata .................... 345/173 |
| 2010/0309171 A1* | 12/2010 | Hsieh ............... G06F 3/0416 345/204 |
| 2011/0102339 A1* | 5/2011 | Lin ....................... 345/173 |

* cited by examiner

*Primary Examiner* — Kenneth Bukowski
(74) *Attorney, Agent, or Firm* — Brinks Gilson & Lione

(57) ABSTRACT

A coordinate detecting device includes a plurality of first and second electrodes, a detecting unit for scanning the first and second electrodes to detect sensor output values of the first and second electrodes, and an arithmetic processing unit for performing an arithmetic process on the basis of the detected sensor output values. When there are a plurality of peak regions in which the sensor output values of both the first and second electrodes are equal to or greater than a first threshold value, the detecting unit detects the sensor output values at intersection points between the first and second electrodes in the peak regions. The arithmetic processing unit calculates the coordinates of a detection target on the basis of the sensor output values at the intersection points between the first and second electrodes in the peak regions and the coordinates of the first and second electrodes in the peak regions.

19 Claims, 8 Drawing Sheets

FIG. 5A

|   | X0 | X1 | X2 | X3 | X4 | X5 | X6 | X7 | X8 | X9 |
|---|----|----|----|----|----|----|----|----|----|----|
| Y9 | 0 | 0 | 0 | 0 | 0 | 0 | 0 | 0 | 0 | 0 |
| Y8 | 0 | 0 | 0 | 0 | 0 | 0 | 0 | 0 | 0 | 0 |
| Y7 | 0 | 0 | 12 | 12 | 0 | 2 | 1 | 1 | 0 | 0 |
| Y6 | 0 | 0 | 15 | 15 | 0 | 4 | 2 | 1 | 0 | 0 |
| Y5 | 0 | 0 | 11 | 11 | 0 | 5 | 3 | 1 | 0 | 0 |
| Y4 | 0 | 0 | 0 | 0 | 0 | 0 | 0 | 0 | 0 | 0 |
| Y3 | 0 | 0 | 3 | 7 | 0 | 11 | 15 | 12 | 0 | 0 |
| Y2 | 0 | 0 | 2 | 3 | 0 | 11 | 15 | 12 | 0 | 0 |
| Y1 | 0 | 0 | 0 | 0 | 0 | 0 | 0 | 0 | 0 | 0 |
| Y0 | 0 | 0 | 0 | 0 | 0 | 0 | 0 | 0 | 0 | 0 |

SECOND PEAK REGION ($SUM_2=76$)
FOURTH PEAK REGION ($SUM_4=20$)
FIRST PEAK REGION ($SUM_1=15$)
THIRD PEAK REGION ($SUM_3=76$)

FIG. 5B

|   | X0 | X1 | X2 | X3 | X4 | X5 | X6 | X7 | X8 | X9 |
|---|----|----|----|----|----|----|----|----|----|----|
| Y9 | 0 | 0 | 0 | 0 | 0 | 0 | 0 | 0 | 0 | 0 |
| Y8 | 0 | 0 | 0 | 0 | 0 | 0 | 0 | 0 | 0 | 0 |
| Y7 | 0 | 0 | 12 | 12 | 0 | 0 | 0 | 0 | 0 | 0 |
| Y6 | 0 | 0 | 15 | 15 | 0 | 0 | 0 | 0 | 0 | 0 |
| Y5 | 0 | 0 | 11 | 11 | 0 | 0 | 0 | 0 | 0 | 0 |
| Y4 | 0 | 0 | 0 | 0 | 0 | 0 | 0 | 0 | 0 | 0 |
| Y3 | 0 | 0 | 0 | 7 | 0 | 11 | 15 | 12 | 0 | 0 |
| Y2 | 0 | 0 | 0 | 0 | 0 | 11 | 15 | 12 | 0 | 0 |
| Y1 | 0 | 0 | 0 | 0 | 0 | 0 | 0 | 0 | 0 | 0 |
| Y0 | 0 | 0 | 0 | 0 | 0 | 0 | 0 | 0 | 0 | 0 |

SECOND PEAK REGION ($SUM_2=76$)
FOURTH PEAK REGION ($SUM_4=0$) → INVALID
FIRST PEAK REGION ($SUM_1=7$)
THIRD PEAK REGION ($SUM_3=76$)

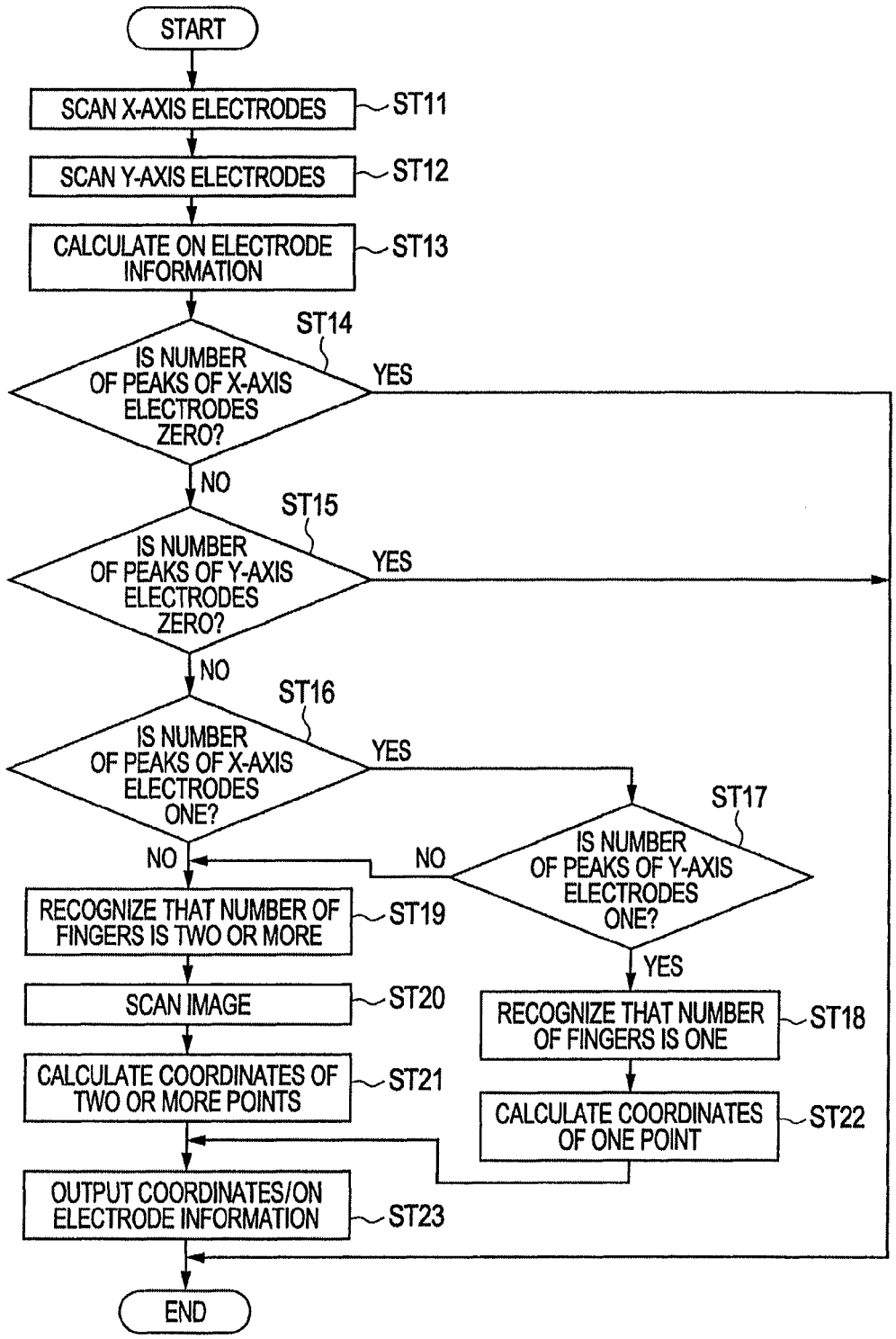

X: COORDINATES DETECTED BY (n-1)-TH
COORDINATE CALCULATION

COORDINATE DETECTING DEVICE

CLAIM OF PRIORITY

This application claims benefit of Japanese Patent Application No. 2011-144102 filed on Jun. 29, 2011, which is hereby incorporated by reference in its entirety.

BACKGROUND

1. Field of the Disclosure

The present disclosure relates to a coordinate detecting device, and more particularly, to a coordinate detecting device related to an operation on a screen.

2. Description of the Related Art

In recent years, a device including a coordinate detecting device which specifies a position where a finger touches to operate an electronic apparatus has been actively developed in electronic apparatuses, such as a computer, a mobile phone terminal, and a PDA (Personal Digital Assistant).

For example, as the device that includes the coordinate detecting device, there is a pointing device (coordinate input device), which is called a pad, a touch pad, or a track pad, provided in the computer. The coordinate input device is incorporated into a portable notebook personal computer or is attached to the outside of a desktop computer, and is then used. In this case, it is not necessary to move the coordinate input device, unlike a mouse. Therefore, it is possible to operate the coordinate input device in a limited space, such as on a desk, without any difficulty.

For example, in a portable apparatus, such as a mobile phone terminal or a PDA in which the coordinate detecting device is incorporated into a display screen, the user can directly touch the display screen (operation surface) with the fingers to perform a desired operation.

For example, as the coordinate detecting device, there is a device which uses a variation in capacitance formed between an electrode and a portion around the electrode due to the contact of the finger of the user. In general, a capacitance-type coordinate detecting device includes a plurality of electrodes that are arranged in a matrix in the X-axis direction and the Y-axis direction and a detecting unit that detects a variation in the capacitance of each electrode, and detects the X-axis and Y-axis electrodes with a large capacitance variation among the plurality of electrodes, thereby specifying the position touched by the user.

In addition, in recent years, a coordinate detecting device has been proposed which detects the touch of two fingers at the same time such that the user can perform an intuitive and simple operation and various operations can be performed according to the position or operation of the two fingers. When two fingers touch the operation surface, a large capacitance variation occurs at two points in each of the X-axis direction and the Y-axis direction. Therefore, it is necessary to detect a plurality of points and determine the user's input gesture.

In this case, when the coordinates of the detection target are specified on the basis of a variation in the capacitance of each electrode obtained by scanning a plurality of X-axis electrodes and Y-axis electrodes, a phenomenon (ghosting phenomenon) occurs in which a capacitance variation is detected even in the region which the detection target does not actually touch. In order to solve this problem, JP-A-2010-267093 discloses a method which applies a gradient to the sensor sensitivity to estimate the distance from the input side of a touch location, thereby selecting a touch position.

However, in the method disclosed in JP-A-2010-267093, when the touch position of the detection target is close to the position where the ghosting phenomenon occurs, there is a concern that the detection target cannot be accurately detected. In order to avoid the occurrence of the ghosting phenomenon, a method is considered which detects all of the sensor output values at the intersection points between a plurality of electrodes. However, in this case, it is considered that the number of scanning operations for the electrodes increases significantly and the detection speed of the coordinates of the detection target is reduced.

SUMMARY

A coordinate detecting device includes: a plurality of first electrodes arranged in a first direction; a plurality of second electrodes arranged in a second direction different from the first direction; a detecting unit configured to scan the plurality of first electrodes and the plurality of second electrodes, thereby detecting sensor output values of the first electrodes and sensor output values of the second electrodes; and an arithmetic processing unit configured to perform an arithmetic process on the basis of the sensor output values detected by the detecting unit. When there are a plurality of peak regions in which the sensor output values of both the first electrodes and the second electrodes are equal to or greater than a first threshold value, the detecting unit detects the sensor output values at intersection points between the first electrodes and the second electrodes in the peak regions. The arithmetic processing unit calculates the coordinates of a detection target on the basis of the sensor output values at the intersection points between the first electrodes and the second electrodes in the peak regions and the coordinates of the first and second electrodes in the peak regions. According to this structure, even when the detection target touches a plurality of portions at the same time, the sensor output values at the intersection points between a plurality of electrodes in the peak region which is set on the basis of the sensor output values of the electrodes are selectively detected. Therefore, it is possible to reduce the number of scanning operations. As a result, it is possible to prevent a reduction in the detection speed and detect the coordinates of the detection target with high accuracy.

BRIEF DESCRIPTION OF THE DRAWINGS

FIGS. 5A and 5B are diagrams illustrating a map table formed on the basis of the sensor output values at the intersection points between the X-axis electrodes and the Y-axis electrodes in a peak region;

FIG. 6 is a flowchart illustrating an example of a process of determining the coordinates of a detection target;

DESCRIPTION OF THE EXEMPLARY EMBODIMENTS

First, a case in which the coordinates of a detection target are determined on the basis of a sensor output value from each of a plurality of electrodes and a case in which the coordinates of the detection target are determined on the basis of a sensor output value at an intersection point between the plurality of electrodes will be described. In an embodiment, the sensor output value detected from the electrode may be changed by the touch of the detection target to an operation surface. For example, in a capacitance type, the sensor output value may be a digitized value of a capacitance variation which is changed by the touch of the detection target.

Figure 2:
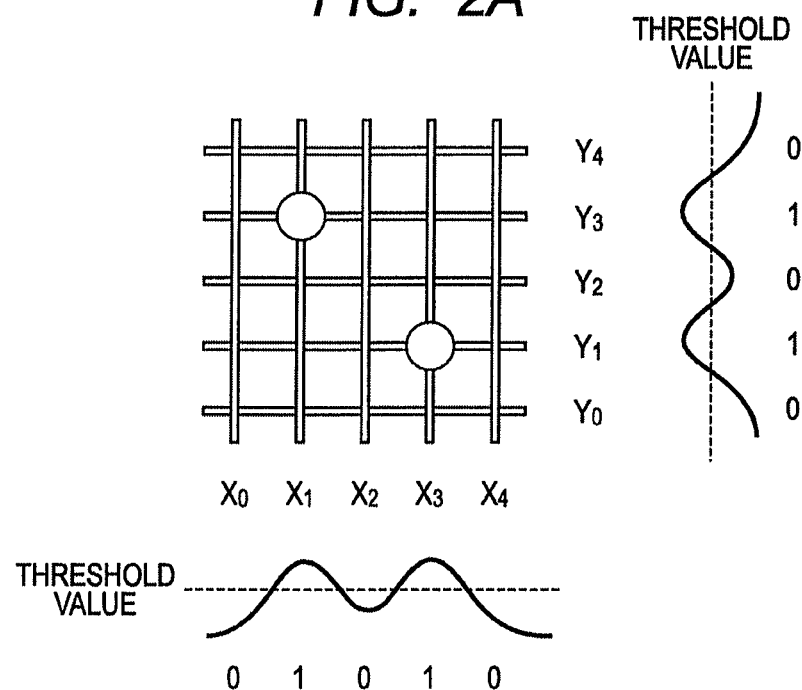
FIG. 2A is a diagram illustrating sensor output values from X-axis electrodes and Y-axis electrodes.
FIG. 2B is a diagram illustrating a map table formed on the basis of the sensor output values.

When the coordinates of the detection target are determined on the basis of the sensor output value from each of the plurality of electrodes (see FIG. 2), a combination of the electrodes from which a sensor output value equal to or greater than a predetermined value (first threshold value) is output is specified. In the structure shown in FIG. 2A, combinations of X-axis electrodes and Y-axis electrodes from which a sensor output value equal to or greater than a first threshold value is output among the X-axis electrodes ($X_0$ to $X_4$) and the Y-axis electrodes ($Y_0$ to $Y_4$) are selected. In this case, the coordinates may be specified on the basis of the sensor output values obtained by scanning five X-axis electrodes ($X_0$ to $X_4$) and five Y-axis electrodes ($Y_0$ to $Y_4$) (the number of scanning operations is 10).

However, as shown in FIG. 2A in which detection targets touch two portions at the same time, when combinations of the X-axis electrodes and the Y-axis electrodes from which a sensor output value equal to or greater than the first threshold value is output are selected, a region which the detection targets actually touch and a region which the detection targets do not actually touch are detected (ghosting phenomenon) (see FIG. 2B). FIG. 2B shows a map table of the XY determination result when a combination of the X-axis electrode and the Y-axis electrode from which a sensor output value equal to or greater than the first threshold value is output is "1". As shown in FIG. 2B, both the coordinate regions ($X_1$, $Y_3$) and ($X_3$, $Y_1$) which the detection targets actually touch and the coordinate regions ($X_1$, $Y_1$) and ($X_3$, $Y_3$) which the detection targets do not touch are determined to be "1".

Figure 3:
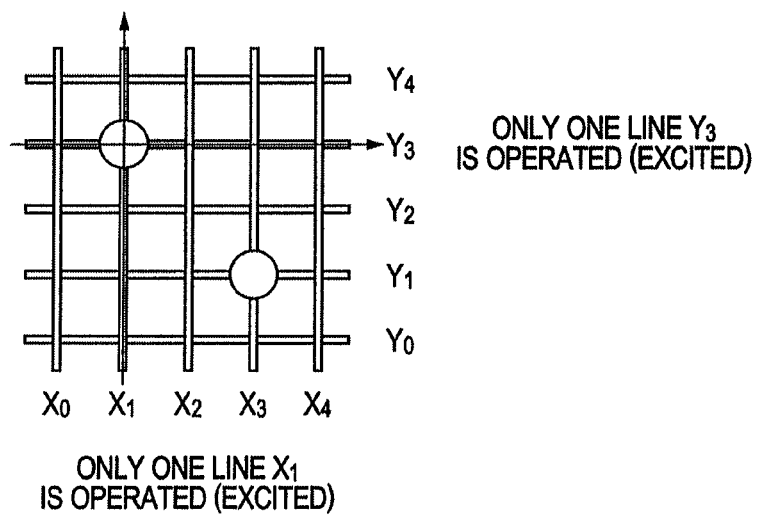
FIG. 3A is a diagram illustrating a method of acquiring the sensor output values at the intersection points between the X-axis electrodes and the Y-axis electrodes.
FIG. 3B is a diagram illustrating a map table formed on the basis of the sensor output values.

When the coordinates of the detection target are determined on the basis of the sensor output value at each intersection point between a plurality of electrodes (see FIG. 3), the sensor output values at all of the intersection points between the electrodes are detected and compared. In the structure shown in FIG. 3A, the sensor output values are detected at all of the intersection points between the X-axis electrodes ($X_0$ to $X_4$) and the Y-axis electrodes ($Y_0$ to $Y_4$).

For example, when the sensor output value at the intersection point between the electrodes $X_1$ and $Y_3$, only the X-axis electrode $X_1$ is excited (driven) and supplied with energy. In this state, only the Y-axis electrode $Y_3$ is operated to detect the sensor output value. In this case, the coordinates may be specified on the basis of the sensor output values obtained by scanning the intersection points between five X-axis electrodes ($X_0$ to $X_4$) and five Y-axis electrodes ($Y_0$ to $Y_4$) using the same process (the number of scanning operations is 25).

When the method shown in FIGS. 3A and 3B are applied, the sensor output values at the intersection points between all of the electrodes are obtained even when the detection targets touch two portions. Therefore, it is possible to specify the coordinate regions ($X_1$, $Y_3$) and ($X_3$, $Y_1$) which the detection targets actually touch, on the basis of the sensor output values (see FIG. 3B). FIG. 3B shows a map table of the XY determination result indicating the sensor output value at each intersection point between the X-axis electrodes and the Y-axis electrodes.

However, when the method shown in FIGS. 3A and 3B are applied, it is necessary to calculate the sensor output values at all of the intersection points between the X-axis electrodes and the Y-axis electrodes, which results in an increase the number of scanning operations. For example, in a coordinate detecting device including 20 X-axis electrodes and 15 Y-axis electrodes, when the method shown in FIGS. 2A and 2B is used, the number of scanning operations for the electrodes is 35. However, when the method shown in FIGS. 3A and 3B is used, 300 scanning operations are needed. When the number of scanning operations increases, a coordinate detection speed is reduced or a detection speed is reduced. In order to solve the problems, it is necessary to provide a new circuit for improving the scanning speed. In the method shown in FIGS. 3A and 3B, even though the detection target touches one portion, it is necessary to calculate the sensor output values at the intersection points between all of the electrodes.

The inventors examined and found that the following method was effective: when the number of regions which the detection target touched was 1 (for example, when one finger touched), the coordinates of the detection target were determined on the basis of the sensor output value from each of a plurality of electrodes; and when the number of regions which the detection target touched was two or more (for example, when two fingers touched), the coordinates of the detection target were determined on the basis of the sensor output values at the intersection points between the plurality of electrodes. That is, the inventors conceived a technique which considered a plurality of touch operations by the user including a touch operation with one finger and a touch operation with two fingers and applied a detecting method suitable for each use aspect.

In addition, a technique is disclosed which sets a predetermined region (peak region) on the basis of the sensor output value from each of a plurality of electrodes, without detecting the sensor output values at all of the intersection points between the plurality of electrodes, even when the number of regions which the detection target touched was two or more, and determining the coordinates of the detection target on the basis of the sensor output values at the intersection points between the electrodes in the peak region. That is, the coordinate detecting device according to this embodiment determines the number of regions which the detection target touches on the basis of the sensor output value from each of the plurality of electrodes and determines the coordinates of the detection target on the basis of the detected sensor output value of each electrode when the number of touch regions is 1. When the number of touch regions is two or more (for example, two), the coordinate detecting device sets a peak region, detects the sensor output values at the intersection points between the electrodes only in the peak region, and determines the coordinates of the detection target.

The peak region may be a combination of the X-axis electrode and the Y-axis electrode from a sensor output value equal to or greater than the first threshold value is output. In this case, the region which is determined to be "1" in FIG. 2B is the peak region. That is, when the number of touch regions is two or more (for example, two), the peak region includes the regions (in FIGS. 2A and 2B, the regions ($X_1$, $Y_3$) and ($X_3$, $Y_1$)) which the detection targets actually touch and the regions (in FIGS. 2A and 2B, the regions ($X_1$, $Y_1$) and ($X_3$, $Y_3$)) which the detection target does not actually touch. Therefore, when the sensor output values at the intersection points between a plurality of electrodes only in the peak region are detected and the coordinates are determined, it is possible to determine the coordinates of the detection target with high accuracy and reduce the number of scanning operations for the electrodes.

Next, the structure of a coordinate detecting device and a detection coordinate calculation method according to embodiments of the invention will be described in detail with reference to the accompanying drawings.

Figure 1:
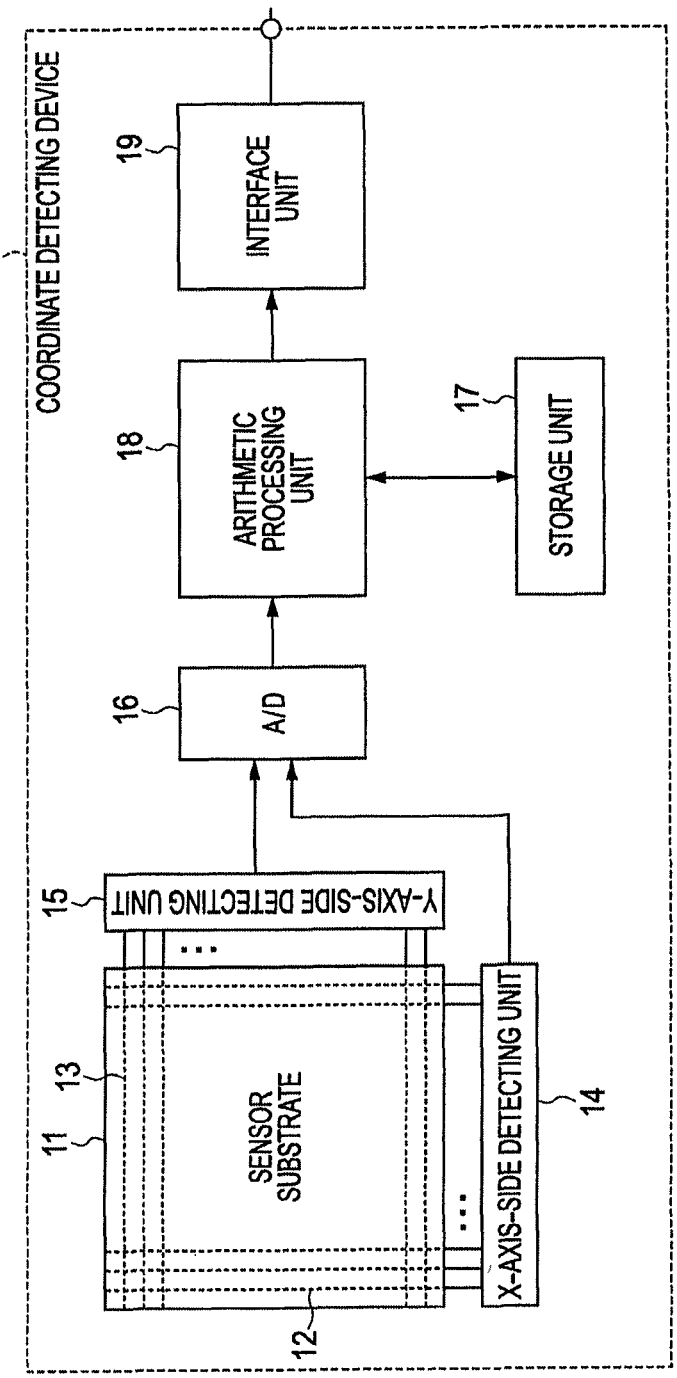
FIG. 1 is a block diagram illustrating a coordinate detecting device according to an embodiment.

FIG. 1 is a block diagram illustrating the main structure of the coordinate detecting device according to this embodiment. A coordinate detecting device 10 shown in FIG. 1 includes a sensor substrate 11, electrodes (X-axis electrodes 12 and Y-axis electrodes 13) that are provided on the sensor substrate 11, detecting units (an X-axis-side detecting unit 14 and a Y-axis-side detecting unit 15) that detect the sensor output value (for example, capacitance) of each electrode, a storage unit 17 that stores, for example, the detected sensor output values, and an arithmetic processing unit 18 that performs an arithmetic process using, for example, the detected sensor output value of each electrode.

A plurality of X-axis electrodes 12 that detect the sensor output values in the X-axis direction (the lateral direction of FIG. 1) and a plurality of Y-axis electrodes 13 that detect the sensor output values in the Y-axis direction (the longitudinal direction of FIG. 1) are arranged in a matrix on the sensor substrate 11.

The coordinate detecting device 10 according to this embodiment may be a type (capacitance type) which specifies a touch position on the basis of a variation in capacitance when a detection target, such as a finger of the user, touches the operation surface. In this case, the coordinate detecting device 10 determines a coordinate region on the basis of a variation in capacitance (capacitance variation) when the detection target touches the operation surface, with respect to the capacitance value of the electrode when the detection target does not touch the operation surface. Examples of the capacitance types include a self-capacitance detection type which detects self-capacitance formed between the electrode and the ground (GND), a mutual capacitance detection type which detects mutual capacitance formed between two electrodes, and a differential mutual capacitance detection type which detects capacitance defined as the difference between the mutual capacitances between a reference electrode and two sensor electrodes. The coordinate detecting device 10 may be any type from among them. In the self-capacitance detection type, the capacitance of a touched portion increases (is changed in the positive direction). In the mutual capacitance detection type, the capacitance of a touched portion decreases (is changed in the negative direction).

In the coordinate detecting device according to this embodiment, the X-axis electrodes 12 and the Y-axis electrodes 13 are arranged so as to be orthogonal to each other. However, for example, the arrangement or number of electrodes is not limited to the structure shown in FIG. 1. In addition, the structure of the coordinate detecting device is not particularly limited as long as it can detect coordinates using the sensor output value which is changed by the touch of the detection target with the operation surface.

The X-axis-side detecting unit 14 detects the sensor output values from the X-axis electrodes 12 arranged in the X-axis direction and the Y-axis-side detecting unit 15 detects the sensor output values from the Y-axis electrodes 13 in the Y-axis direction. When the sensor output values at the intersection points between the X-axis electrodes 12 and the Y-axis electrodes 13 are detected, a specific electrode is selected from the X-axis electrodes 12, a specific electrode is selected from the Y-axis electrodes 13 and one of the selected electrodes is excited (driven) and supplied with energy. In this state, the other electrode is operated to detect the sensor output value.

In this embodiment, the sensor output value is the digitized value of a variation in the sensor output which is changed by the touch of the detection target. The arithmetic processing unit 18 may calculate the coordinates using a value output from the detecting unit as the sensor output value, or it may calculate the coordinates using a value (sensor output variation) obtained by comparison between the value output from the detecting unit and a reference value. The sensor output variation may be obtained from the difference between the output value from the electrode when the detection target touches and the output value (reference value) from the electrode when the detection target does not touch. For example, when capacitance is used to detect the touch of the detection target, the capacitance value of each electrode output from the detecting unit is compared with the capacitance value (reference capacitance value) of the electrode when the detection target does not touch to obtain a capacitance variation.

An A/D (analog/digital) conversion unit 16 converts the detection signal (data for the sensor output value of the X-axis electrode 12) of the X-axis-side detecting unit 14 and the detection signal (data for the sensor output value of the Y-axis electrode 13) of the Y-axis-side detecting unit 15 into digital signals and supplies the digital signals to the arithmetic processing unit 18 and the storage unit 17.

The storage unit 17 has a storage area for storing the detected sensor output values of the electrodes. In this embodiment, the sensor output values detected by the X-axis-side detecting unit 14 and the Y-axis-side detecting unit 15 are supplied to the storage unit 17 through the arithmetic processing unit 18. However, the detected sensor output values may be directly supplied from the X-axis-side detecting unit 14 and the Y-axis-side detecting unit 15 to the storage unit 17 through the A/D conversion unit 16.

The arithmetic processing unit 18 performs an arithmetic process using the sensor output values stored in the storage unit 17 to determine the number of regions which the detection target touches or the coordinates. Specifically, the arithmetic processing unit 18 determines the number of regions which the detection target touches, on the basis of the sensor output values of a plurality of electrodes detected by the detecting units (the X-axis-side detecting unit 14 and the Y-axis-side detecting unit 15). When the number of touch regions is one, the arithmetic processing unit 18 determines the coordinates on the basis of the detected sensor output values. When the number of touch regions is two or more (for example, two), the arithmetic processing unit 18 sets a plurality of peak regions and determines the coordinates on the basis of the sensor output values at the intersection points between the electrodes in the peak regions. The number of touch regions may be determined on the basis of the number of peaks equal to or greater than the first threshold value among the sensor output values of a plurality of X-axis electrodes 12 and the sensor output values of a plurality of Y-axis electrodes 13.

The arithmetic processing unit 18 performs a coordinate region determining process using a coordinate detecting program which is stored in the storage unit 17 or a separate memory. The coordinate detecting program includes, for example, a step of determining the number of regions which the detection target touches, a step of determining the coordinates of the detection target on the basis of the sensor output values of a plurality of electrodes when the number of touch regions is one, a step of setting a peak region on the basis of the sensor output value from each electrode when the number of touch regions is two or more and detecting the sensor output value at the intersection point between the electrodes in the peak region, and a step of selecting a peak region in which the sensor output value at the intersection point between the electrodes is large and determines the coordinates of the detection target on the basis of the sensor output value at the intersection point between the electrodes and the coordinates of the peak electrode. The arithmetic processing unit 18 can perform a series of processes according to the coordinate detecting program to determine the coordinates of the detection target.

In the determination of the number of touch regions, when the numbers of detected peaks where the sensor output value is equal to or greater than the first threshold value are different in the X-axis direction and the Y-axis direction, the arithmetic processing unit 18 determines the larger of the number of peaks in the X-axis direction and the number of peaks in the Y-axis direction to be the number of regions which the detection target touches. For example, when the fingers touch two portions of the operation surface and the two touch portions are arranged in parallel in the X-axis direction or the Y-axis direction, two peaks are detected in one of the sensor output values of the X-axis electrode and the Y-axis electrode and no peak is detected in the other sensor output value. As such, since the number of regions which the detection target touches is specified on the basis of a simple criterion, it is possible to reduce the time required for the arithmetic process.

An interface unit 19 is a circuit for data communication between the coordinate detecting device 10 and a circuit or apparatus with a different structure. For example, when the coordinate detecting device 10 according to this embodiment is applied to a pointing device (input device), such as the touch pad of a personal computer, it may be connected to an apparatus which outputs coordinates to a display unit of the personal computer through the interface unit 19. When the coordinate detecting device according to this embodiment is incorporated into a display screen of a portable apparatus, such as a mobile phone terminal or a PDA, it may be connected to a circuit which performs an operation or process corresponding to the coordinates specified by the arithmetic processing unit 18 through the interface unit 19. As such, the coordinate detecting device according to this embodiment can be incorporated into various coordinate input devices.

Figure 4:
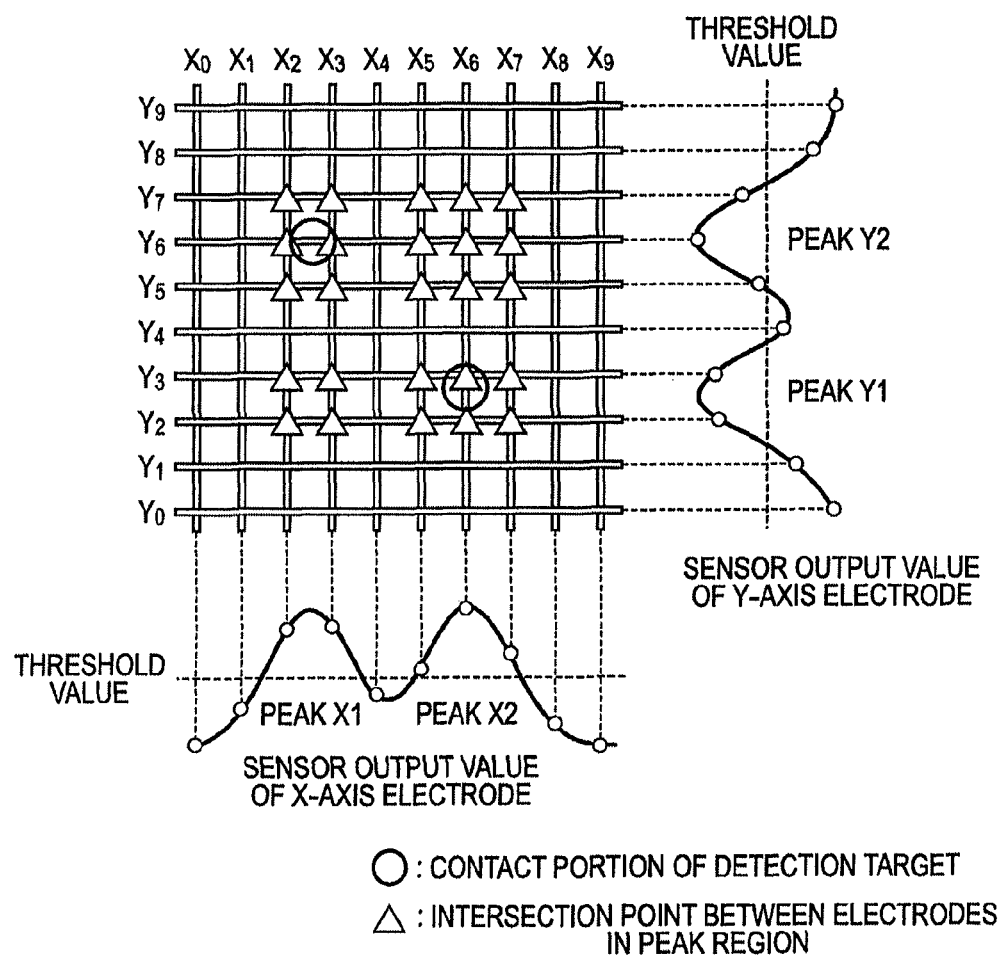
FIG. 4 is a diagram illustrating the X-axis electrodes and the Y-axis electrodes of the coordinate detecting device according to this embodiment and the sensor output values from the X-axis electrodes and the Y-axis electrodes.

Next, a process of determining the coordinates of the detection target in the coordinate detecting device according to this embodiment will be described in detail with reference to the flowchart of FIG. 6. In the following description, as shown in FIG. 4, the coordinate determining process when two fingers (finger 1 and finger 2) simultaneously touch the operation surface on which 10 X-axis electrodes ($X_0$ to $X_9$) and 10 Y-axis electrodes ($Y_0$ to $Y_9$) are provided in a matrix will be described. In the coordinate detecting device according to this embodiment, the number of X-axis electrodes 12 and Y-axis electrodes 13 and the number of fingers which can be detected are not limited thereto.

<Step of Determining Number of Regions which Detection Target Touches>

In the step of determining the number of regions which the detection target touches, first, the detecting units (the X-axis-side detecting unit 14 and the Y-axis-side detecting unit 15) scan the X-axis electrodes 12 and the Y-axis electrodes 13 and detect the sensor output values of the electrodes (Steps ST11 and ST12). Here, the detecting units scan 10 X-axis electrodes ($X_0$ to $X_9$) and 10 Y-axis electrodes ($Y_0$ to $Y_9$) (the number of scanning operations is 20).

Then, the arithmetic processing unit 18 determines the number of regions which the detection target touches, on the basis of the detected sensor output values of the electrodes (Steps ST13 to ST19). For example, the arithmetic processing unit 18 performs an ON electrode information calculating process (Step ST13) of detecting the number of peaks where the absolute value of the sensor output value is equal to or greater than the first threshold value, for the sensor output values of a plurality of electrodes in the X-axis direction and the Y-axis direction, and determines the number of regions which the detection target touches, on the basis of the detected number of peaks. The number of touch regions may be determined to be equal to the larger of the numbers of peaks in the sensor output values in the X-axis direction and the Y-axis direction. In this case, the number of regions which the detection target touches may be determined on the basis of the map table of the XY determination result.

When the touch of the detection target is detected ("No" in Step ST14 and "No" in Step ST15) and there are two or more peaks where the absolute value of the sensor output value is equal to or greater than the first threshold value in the sensor output values of a plurality of X-axis electrodes 12 or/and the sensor output values of a plurality of Y-axis electrodes 13 ("No" in Step ST16 and "No" in Step ST17), the arithmetic processing unit 18 determines that the number of regions which the detection target touches is two or more (Step ST19). On the other hand, when there is one peak in both the sensor output values of the plurality of X-axis electrodes 12 and the sensor output values of the plurality of Y-axis electrodes 13, the arithmetic processing unit 18 determines that the number of regions which the detection target touches is one (Step ST18). In this case, in the distribution of the sensor output values of the plurality of X-axis electrodes 12 in the X-axis direction, successive electrodes with a sensor output value equal to or greater than the first threshold value are counted as one peak. This holds for the Y-axis electrodes 13.

Figure 9:
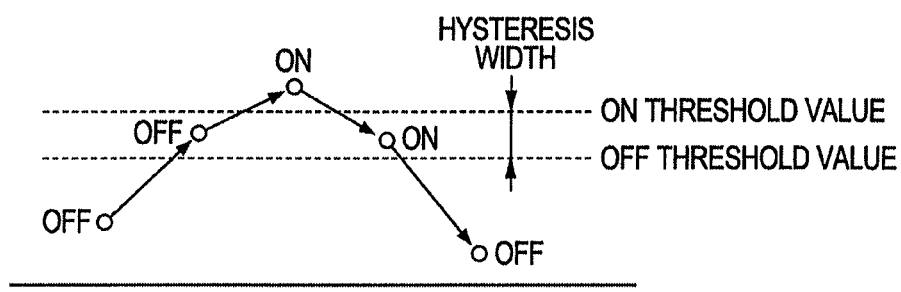
FIG. 9 is a diagram illustrating a method of setting a first threshold value.

In the case shown in FIG. 4, the arithmetic processing unit 18 determines the electrodes $X_2$ and $X_3$ of which the absolute values of the sensor output values are successively equal to or greater than the first threshold value in the X-axis direction to be a first peak (X1) and determines the electrodes $X_5$ to $X_7$ of which the absolute values of the sensor output values are successively equal to or greater than the first threshold value in the X-axis direction to be a second peak (X2). Similarly, the arithmetic processing unit 18 determines the electrodes $Y_2$ and $Y_3$ of which the absolute values of the sensor output values are successively equal to or greater than the first threshold value in the Y-axis direction to be a first peak (Y1) and determines the electrodes $Y_5$ to $Y_7$ of which the absolute values of the sensor output values are successively equal to or greater than the first threshold value in the Y-axis direction to be a second peak (Y2). That is, the arithmetic processing unit 18 determines that the number of regions which the detection target touches is two or more. In this embodiment, the first threshold value may have a constant width. For example, as shown in FIG. 9, an ON threshold value and an OFF threshold value may be set to the first threshold value to obtain hysteresis characteristics. In this way, it is possible to remove the fluctuation of an input signal in the vicinity of the first threshold value.

<Image Scanning Step>

In the step of determining the touch region of the detection target, when it is determined that the number of regions which the detection target touches is two or more, an image scanning step is performed (Step ST20). In the image scanning step, the arithmetic processing unit 18 sets a peak region on the basis of the sensor output value from each electrode and the detecting units (the X-axis-side detecting unit 14 and the Y-axis-side detecting unit 15) detect the sensor output value at the intersection point between the electrodes in the peak region.

The peak region may be a region in which the absolute value of the sensor output value from both the X-axis electrode 12 and the Y-axis electrode 13 is equal to or greater than the first threshold value, that is, a region corresponding to a combination of the X-axis electrode and the Y-axis electrode from which the sensor output values equal to or greater than the first threshold value successively output. In the case shown in FIG. 4, four peak regions, that is, a first peak region ($X_2$ to $X_3$, $Y_2$ to $Y_3$), a second peak region ($X_2$ to $X_3$, $Y_5$ to $Y_7$), a third peak region ($X_5$ to $X_7$, $Y_2$ to $Y_3$), and a fourth peak region ($X_5$ to $X_7$, $Y_5$ to $Y_7$) are set.

In this case, the peak regions include the regions (the second peak region ($X_2$ to $X_3$, $Y_5$ to $Y_7$) and the third peak region ($X_5$ to $X_7$, $Y_2$ to $Y_3$)) which the detection target actually touches and the regions (the first peak region ($X_2$ to $X_3$, $Y_2$ to $Y_3$) and the fourth peak region ($X_5$ to $X_7$, $Y_5$ to $Y_7$)) which the detection target does not actually touch.

Then, the detecting unit selectively scans the corresponding electrodes in order to detect the sensor output values at the intersection points between the X-axis electrodes 12 and the Y-axis electrodes 13 in the first to fourth peak regions (the number of scanning operations is 25). In this way, the sensor output value (a portion represented by Δ in FIG. 4) at the intersection point between a specific X-axis electrode 12 and a specific Y-axis electrode 14 is obtained. FIG. 5A shows the map table of the XY determination result indicating the sensor output values at the intersection points between the X-axis electrodes and the Y-axis electrodes in the first to fourth peak regions. In FIG. 5A, a portion in which the detection of the sensor output value at the intersection point is not performed is represented by "0".

As such, when the sensor output values are detected at the intersection points between a plurality of electrodes only in the peak region, it is possible to reduce the number of scanning operations for the electrodes, as compared to when the intersection points between all of the electrodes are scanned (the number of scanning operations is 100).

<Coordinate Calculating Step>

In the step of determining the number of regions which the detection target touches, when it is determined that the number of regions which the detection target touches is two or more, the coordinates of the regions which the detection target touches are calculated on the basis of the sensor output values at the intersection points between the electrodes in a plurality of peak regions and the coordinates of the electrodes in the peak regions (Step ST21). In this case, since the plurality of peak regions include the region which the detection target actually touches and the region which the detection target does not actually touch, the coordinates are determined on the basis of data for the peak region which the detection target actually touches.

For example, the arithmetic processing unit 18 adds the absolute values of the sensor output values at the intersection points between the electrodes in each peak region and selects the peak region with a large sum (SUM). Then, the arithmetic processing unit 18 can calculate the coordinates of the detection target, using a calculation method, such as a centroid calculation method, on the basis of the sensor output values at the intersection points between the electrodes in the selected peak region and the coordinates (for example, the coordinates of the intersection points) of the electrodes in the peak region.

The arithmetic processing unit 18 selects the same number of peak regions (here, "2" peak regions) as the number of regions which the detection target touches from a plurality of peak regions in descending order of the sum (SUM). That is, the number of peak regions selected is equal to the larger of the number of peaks in the sensor output values of a plurality of X-axis electrodes and the number of peaks in the sensor output values of a plurality of Y-axis electrodes.

When the sensor output value of each electrode is as shown in FIG. 4, the sum ($SUM_1$) of the sensor output values at the intersection points between the electrodes in the first peak region ($X_2$ to $X_3$, $Y_2$ to $Y_3$) is 15, the sum ($SUM_2$) of the sensor output values at the intersection points between the electrodes in the second peak region ($X_2$ to $X_3$, $Y_5$ to $Y_7$) is 76, the sum ($SUM_3$) of the sensor output values at the intersection points between the electrodes in the third peak region ($X_5$ to $X_7$, $Y_2$ to $Y_3$) is 76, and the sum ($SUM_4$) of the sensor output values at the intersection points between the electrodes in the fourth peak region ($X_5$ to $X_7$, $Y_5$ to $Y_7$) is 20 (see FIG. 5A).

Therefore, when it is determined that the number of regions which the detection target touches is 2, the arithmetic processing unit 18 selects the top two peak regions (the second peak region and the third peak region) with the largest sum of the sensor output values. Then, the arithmetic processing unit 18 can calculate the coordinates of the detection target, using the centroid calculation method, on the basis of the sensor output values at the intersection points between the electrodes and the coordinates of the electrodes in the second peak region and the third peak region. A coordinate calculation method is not limited to the centroid calculation method, but other methods, such as a curve approximation method, may be used.

The arithmetic processing unit 18 may treat only the sensor output value greater than a second threshold value among the sensor output values at the intersection points between the electrodes as effective data before comparing the sums (SUM) of the sensor output values. In this case, the arithmetic processing unit 18 treats the sensor output value equal to or less than the second threshold value among the sensor output values at the intersection points between the electrodes as invalid data (for example, "0"). Therefore, the peak region in which the sum (SUM) of the sensor output values at the intersection points between the electrodes is 0 may be determined to be invalid.

For example, when the second threshold value is 5, the sensor output value which is equal to or less than 5 at the intersection point between the electrodes is invalid (0) (see FIG. 5B). As a result, the sum (SUM) of the fourth peak region which the detection target does not actually touch is 0 and the fourth peak region can be determined to be invalid. However, in some cases, the sum of the sensor output values at the intersection points between the electrodes in the peak region which the detection target does not actually touch is not 0 (for example, the first peak region in FIG. 5B). In this case, since the sum ($SUM_1$) of the sensor output values is the third largest value, the peak region is not selected to determine the coordinates.

As such, when the sensor output value equal to or less than the second threshold value is set to 0, it is possible to exclude the sensor output value which occurs in the peak region which the detection target does not actually touch due to, for example, noise. Even when the peak region which the detection target does not actually touch is determined to be valid, it is possible to increase the difference between the sum of the sensor output values in the peak region which the detection target touches and the sum of the sensor output values in the peak region which the detection target does not touch, thereby clearly distinguishing the peak regions.

When continuously calculating the coordinates of the detection target, the arithmetic processing unit 18 may set the second threshold value to different values for each region in an n-th coordinate calculating operation, considering the coordinates obtained by the previous (n−1)-th coordinate calculating operation. This is because the detection target is likely to be disposed in the vicinity of the coordinates specified by the (n−1)-th coordinate calculating operation in the n-th coordinate calculating operation.

Figure 8:
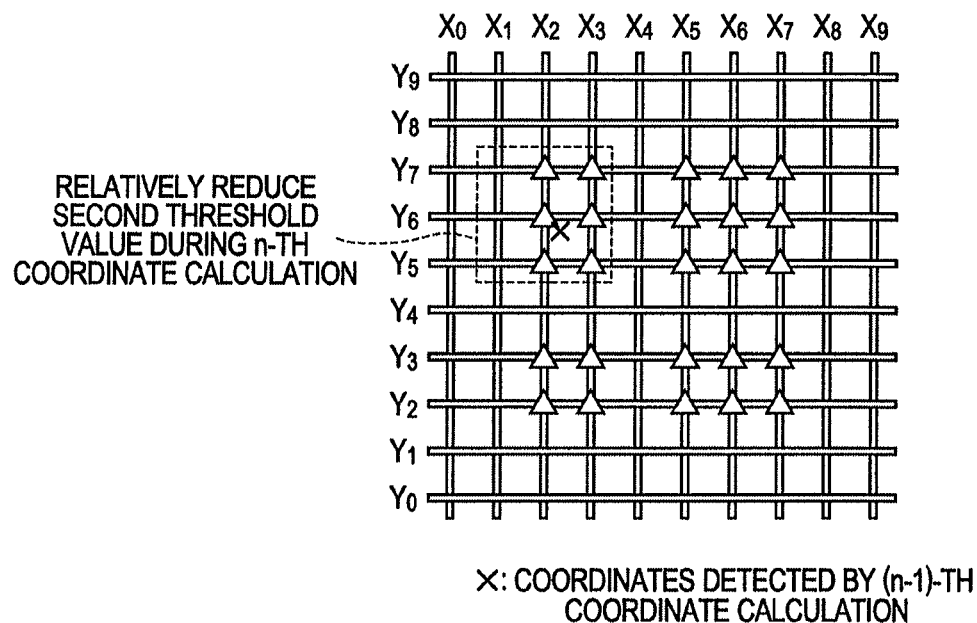
FIG. 8 is a diagram illustrating a method of setting a second threshold value when the coordinates of the detection target are continuously calculated.

For example, in the n-th coordinate calculating operation, the second threshold value may be set to a relatively small value at the intersection points between the electrodes (the X-axis electrode and the Y-axis electrode) closest to the coordinates specified by the (n−1)-th coordinate calculating operation and electrodes adjacent to the electrodes. When the electrodes ($X_2$ and $Y_6$) are closest to the coordinates specified by the (n−1)-th coordinate calculating operation (see FIG. 8), the second threshold value is set to a relatively small value at the intersection points (in this case, 9 intersection points) between the X-axis electrodes and the Y-axis electrodes including the electrodes ($X_1$, $X_3$, $Y_5$, and $Y_7$) adjacent to each electrode. In addition, the electrodes closest to the coordinates specified by the (n−1)-th coordinate calculating operation may be determined on the basis of the coordinates and electrode resolution. In this way, even when the touch area of the finger complemented by the previous coordinate calculating operation is temporarily reduced with the movement of the finger, the peak region can be determined to be valid. As a result, even when the touch area is temporarily reduced with the movement of the detection target and the sensor output value is reduced, it is possible to prevent the previously complemented detection target from being lost (undetected).

When continuously calculating the coordinates of the detection target, the arithmetic processing unit 18 may determine the coordinates in the n-th coordinate calculating operation, considering the coordinates obtained by the previous (n−1)-th coordinate calculating operation. For example, the arithmetic processing unit 18 may compare the coordinates obtained by the (n−1)-th coordinate calculating operation with the coordinates of a plurality of peak regions set by the n-th coordinate calculating operation and determine the coordinates of a peak region closest to the (n−1)-th coordinates among the coordinates of the peak regions set by the n-th coordinate calculating operation to be the coordinates of the detection target in the n-th coordinate calculating operation.

Specifically, as shown in the following Expression 1, $\sqrt{((X_{OLD}-X)^2+(Y_{OLD}-Y)^2)}$ the X coordinate and the Y coordinate where $\sqrt{((X_{OLD}-X)^2+(Y_{OLD}-Y)^2)}$ is the minimum are calculated to determine the coordinates of the detection target. The coordinates of a plurality of peak regions set by the n-th coordinate calculating operation may be calculated by, for example, the centroid calculation method on the basis of the sensor output values at the intersection points between the electrodes and the coordinates of the electrodes.

$$MIN(\sqrt{((X_{OLD}-X)^2+(Y_{OLD}-Y)^2)})$$ [Expression 1]

(where $X_{OLD}$ indicates a previous X-axis output coordinate, $Y_{OLD}$ indicates a previous Y-axis output coordinate, X indicates the X-axis coordinate of the centroid of each peak region, and Y indicates the Y-axis coordinate of the centroid of each peak region).

In the step of determining the number of regions which the detection target touches, when it is determined that the number of regions which the detection target touches is one, the arithmetic processing unit 18 calculates the coordinate region of the detection target on the basis of the sensor output value of each electrode (Step ST22). In this case, since there is one peak region in which the sensor output values of the X-axis electrode 12 and the Y-axis electrode 13 are equal to or greater than the first threshold value, the coordinates of the detection target are calculated on the basis of the sensor output values of the electrodes in the peak region and the coordinates of the electrodes.

After calculating the coordinates of the detection target, the arithmetic processing unit 18 outputs the obtained coordinates or ON electrode information (Step ST23).

In this embodiment, when the number of regions which the detection target touches is two or more, the image scanning step is performed. However, in the coordinate detecting device according to this embodiment, the image scanning step may be performed only when it is determined that the number of regions which the detection target touches is two. That is, where there are three or more peaks where the absolute value of the sensor output value is equal to or greater than the first threshold value in the sensor output values of a plurality of X-axis electrodes 12 and/or the sensor output values of a plurality of Y-axis electrodes 13, the detection of the sensor output values at the intersection points between the X-axis electrodes and the Y-axis electrodes may not be performed.

Figure 7:
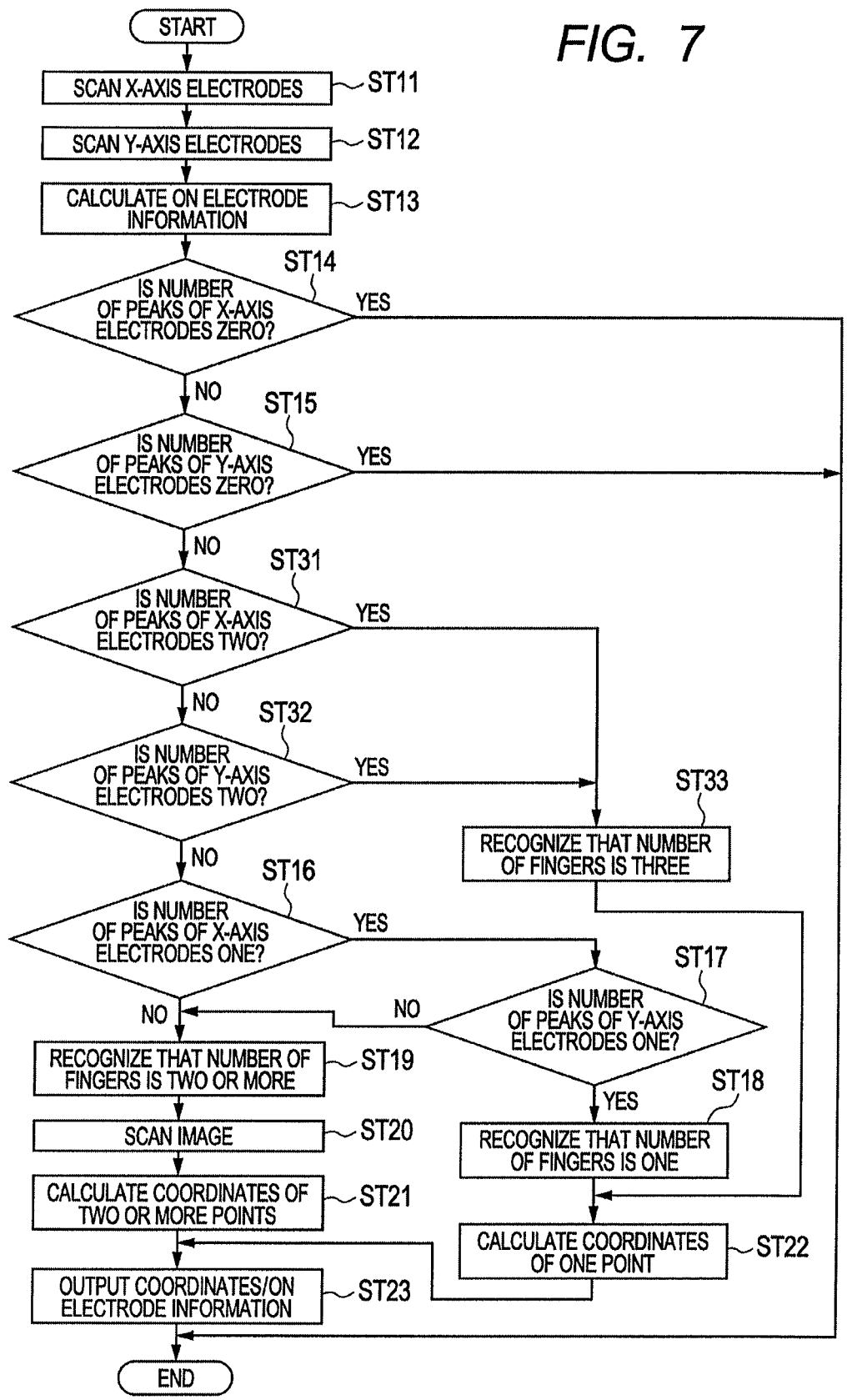
FIG. 7 is a flowchart illustrating an example of the process of determining the coordinates of the detection target.

In this case, in the step of determining the number of regions which the detection target touches, when it is determined that the number of regions which the detection target touches is three or more (Steps ST31 to ST33 in FIG. 7), the image scanning step may not be performed and the same process as that when the number of regions which the detection target touches is one may be performed. In addition, when it is determined that the number of regions which the detection target touches is three or more, the detection of the coordinates may not be performed.

In general, when multi-touch is performed, from the user's point of view, an effective operation is considered to be one performed with two fingers. This is because the touch operation by the user with three or more fingers is complicated and is not intuitive. Therefore, preferably, the image scanning step causing an increase in the number of scanning operations is performed to detect the sensor output values at the intersection points between the electrodes only when the number of regions which the detection target touches is two, and the image scanning step is not performed when the number of regions which the detection target touches is one or three or more. In this way, it is possible to prevent an unnecessary scanning operation and detect the coordinates with the optimal number of scanning operations according to the state of use.

The invention is not limited to the above-described embodiment. Various modifications and changes of the invention can be made without departing from the scope and spirit of the invention.

It should be understood by those skilled in the art that various modifications, combinations, sub-combinations and alterations may occur depending on design requirements and other factors insofar as they are within the scope of the appended claims of the equivalents thereof.

What is claimed is:

1. A coordinate detecting device comprising:
   a plurality of first electrodes arranged in a first direction and a plurality of second electrodes arranged in a second direction different from the first direction;
   a detecting unit configured to scan the plurality of first electrodes and the plurality of second electrodes, thereby detecting sensor output values of the first electrodes and sensor output values of the second electrodes which a detection target touches; and
   an arithmetic processing unit configured to determine a number of regions which the detection target touches on the basis of the sensor output values, and changes a coordinate calculation process based on the number of the detected regions,
   wherein, when there are a plurality of peak regions in which the sensor output values of both the first electrodes and the second electrodes are equal to or greater than a first threshold value, the detecting unit detects the sensor output values at intersection points between the first electrodes and the second electrodes in the peak regions by selectively scanning only the first electrodes and the second electrodes corresponding to each intersection point in the peak regions, and
   the arithmetic processing unit calculates the coordinates of the detection target on the basis of only the sensor output values at the intersection points between the first electrodes and the second electrodes in the peak regions and the coordinates of the first and second electrodes in the peak regions;
   wherein, when there is a single peak regions in which the sensor output values of both the first electrodes and the second electrodes are equal to or greater than the first threshold value, the arithmetic processing unit calculates the coordinates on the basis of the sensor output values each of the plurality of first electrodes and the sensor output values of the plurality of second electrodes;
   wherein the first threshold value comprises an ON threshold value and an OFF threshold value; and
   wherein when calculating the coordinates of the detection target, the detection of the peak region is changed according to whether the first threshold value has been in the ON threshold value or the OFF threshold value in a previous detection of the scan.

2. The coordinate detecting device according to claim 1, wherein, when there are a plurality of peaks where the sensor output value is equal to or greater than the first threshold value in the sensor output values of at least one of the plurality of first electrodes and the sensor output values of the plurality of second electrodes, the arithmetic processing unit determines that there are a plurality of peak regions and sets, as the peak region, a region in which the sensor output values of both the first electrodes and the second electrodes are equal to or greater than the first threshold value.

3. The coordinate detecting device according to claim 2, wherein the arithmetic processing unit calculates the sum of the sensor output values at the intersection points between the first electrodes and the second electrodes in each of the plurality of peak regions, selects a peak region with a large sum from the plurality of peak regions, and calculates the coordinates of the detection target on the basis of the sensor output values at the intersection points between the first electrodes and the second electrodes in the selected peak region and the coordinates of the first and second electrodes in the selected peak region.

4. The coordinate detecting device according to claim 3, wherein the number of peak regions selected by the arithmetic processing unit is equal to the larger of the number of peaks in the sensor output values of the plurality of first electrodes and the number of peaks in the sensor output values of the plurality of second electrodes.

5. The coordinate detecting device according to claim 4, wherein, when the sensor output values at the intersection points between the first electrodes and the second electrodes in each peak region are equal to or less than a second threshold value, the arithmetic processing unit determines the sensor output values to be invalid and calculates the sum in each peak region.

6. The coordinate detecting device according to claim 5, wherein, when continuously calculating the coordinates of the detection target, the arithmetic processing unit sets the second threshold value to a relatively small value in an n-th coordinate calculating operation at the intersection points between the first and second electrodes closest to the coordinates specified by an (n−1)-th coordinate calculating operation and electrodes adjacent to the first and second electrodes.

7. The coordinate detecting device according to claim 3, wherein, when the sensor output values at the intersection points between the first electrodes and the second electrodes in each peak region are equal to or less than a second threshold value, the arithmetic processing unit determines the sensor output values to be invalid and calculates the sum in each peak region.

8. The coordinate detecting device according to claim 7, wherein, when continuously calculating the coordinates of the detection target, the arithmetic processing unit sets the second threshold value to a relatively small value in an n-th coordinate calculating operation at the intersection points between the first and second electrodes closest to the coordinates specified by an (n−1)-th coordinate calculating operation and electrodes adjacent to the first and second electrodes.

9. The coordinate detecting device according to claim 1, wherein the arithmetic processing unit calculates the sum of the sensor output values at the intersection points between the first electrodes and the second electrodes in each of the plurality of peak regions, selects a peak region with a large sum from the plurality of peak regions, and calculates the coordinates of the detection target on the basis of the sensor output values at the intersection points between the first electrodes and the second electrodes in the selected peak region and the coordinates of the first and second electrodes in the selected peak region.

10. The coordinate detecting device according to claim 9, wherein the number of peak regions selected by the arithmetic processing unit is equal to the larger of the number of peaks in the sensor output values of the plurality of first electrodes and the number of peaks in the sensor output values of the plurality of second electrodes.

11. The coordinate detecting device according to claim 10, wherein, when the sensor output values at the intersection points between the first electrodes and the second electrodes in each peak region are equal to or less than a second threshold value, the arithmetic processing unit determines the sensor output values to be invalid and calculates the sum in each peak region.

12. The coordinate detecting device according to claim 11, wherein, when continuously calculating the coordinates of the detection target, the arithmetic processing unit sets the second threshold value to a relatively small value in an n-th coordinate calculating operation at the intersection points between the first and second electrodes closest to the coordinates specified by an (n−1)-th coordinate calculating operation and electrodes adjacent to the first and second electrodes.

13. The coordinate detecting device according to claim 9, wherein, when the sensor output values at the intersection points between the first electrodes and the second electrodes in each peak region are equal to or less than a second threshold value, the arithmetic processing unit determines the sensor output values to be invalid and calculates the sum in each peak region.

14. The coordinate detecting device according to claim 13, wherein, when continuously calculating the coordinates of the detection target, the arithmetic processing unit sets the second threshold value to a relatively small value in an n-th coordinate calculating operation at the intersection points between the first and second electrodes closest to the coordinates specified by an (n−1)-th coordinate calculating operation and electrodes adjacent to the first and second electrodes.

15. The coordinate detecting device according to claim 1, wherein, when continuously calculating the coordinates of the detection target, the arithmetic processing unit compares the coordinates obtained by an (n−1)-th coordinate calculating operation with the coordinates of a plurality of peak regions set by an n-th coordinate calculating operation and sets the coordinates of a peak region closest to the coordinates obtained by the (n−1)-th coordinate calculating operation as the coordinates of the detection target in the n-th coordinate calculating operation.

16. The coordinate detecting device according to claim 1, wherein the arithmetic processing unit calculates the coordinates of the detection target using a centroid calculation method on the basis of the sensor output values at the intersection points between the first electrodes and the second electrodes in the peak region and the coordinates of the first and second electrodes in the peak region.

17. A coordinate input device comprising:
a unit that controls the input of coordinates, the unit comprising a coordinate detecting device comprising:
a coordinate detecting device comprising:
a plurality of first electrodes arranged in a first direction and a plurality of second electrodes arranged in a second direction different from the first direction;
a detecting unit configured to scan the plurality of first electrodes and the plurality of second electrodes, thereby detecting sensor output values of the first electrodes and sensor output values of the second electrodes which a detection target touches; and
an arithmetic processing unit configured to determine a number of regions which the detection target touches on the basis of the sensor output values, and changes a coordinate calculation process based on the number of the detected regions,
wherein, when there are a plurality of peak regions in which the sensor output values of both the first electrodes and the second electrodes are equal to or greater than a first threshold value, the detecting unit detects the sensor output values at intersection points between the first electrodes and the second electrodes in the peak regions by selectively scanning only the first electrodes and the second electrodes corresponding to each intersection point in the peak regions, and
the arithmetic processing unit calculates the coordinates of the detection target on the basis of only the sensor output values at the intersection points between the first electrodes and the second electrodes in the peak regions and the coordinates of the first and second electrodes in the peak regions; and
wherein, when there is a single peak regions in which the sensor output values of both the first electrodes and the second electrodes are equal to or greater than the first threshold value, the arithmetic processing unit calculates the coordinates on the basis of the sensor output values of each the plurality of first electrodes and the sensor output values of the plurality of second electrodes;
wherein the first threshold value comprises an ON threshold value and an OFF threshold value; and
wherein when calculating the coordinates of the detection target, the detection of the peak region is changed according to whether the first threshold value has been in the ON threshold value or the OFF threshold value in a previous detection of the scan.

18. A coordinate detecting device comprising:
a plurality of first electrodes arranged in a first direction and a plurality of second electrodes arranged in a second direction different from the first direction;
a detecting unit configured to scan the plurality of first electrodes and the plurality of second electrodes, thereby detecting sensor output values of the first electrodes and sensor output values of the second electrodes which a detection target; and
an arithmetic processing unit configured to determine a number of regions which the detection target touches on the basis of the sensor output values, and changes a coordinate calculation process based on the number of the detected regions,
wherein, when there are a plurality of peak regions in which the sensor output values of both the first electrodes and the second electrodes are equal to or greater than a first threshold value, the detecting unit detects the sensor output values at only intersection points between the first electrodes and the second electrodes in the peak regions, and
the arithmetic processing unit calculates the coordinates of the detection target on the basis of only the sensor output values at the intersection points between the first electrodes and the second electrodes in the peak regions and the coordinates of the first and second electrodes in the peak regions and the arithmetic processing unit calculates the sum of the sensor output values at the intersection points between the first electrodes and the second electrodes in each of the plurality of peak regions, selects a peak region with a large sum from the plurality of peak regions, and calculates the coordinates of the detection target on the basis of the sensor output values at the intersection points between the first electrodes and the second electrodes in the selected peak region and the coordinates of the first and second electrodes in the selected peak region;

wherein the number of peak regions selected by the arithmetic processing unit is equal to the larger of the number of peaks in the sensor output values of the plurality of first electrodes and the number of peaks in the sensor output values of the plurality of second electrodes;

wherein the larger of the number of peaks in the sensor output values of the plurality of first electrodes and the number of peaks in the sensor output values of the plurality of second electrodes is determined as the number of the peak regions to be selected, and the peak regions to be selected are selected from the plurality of peak regions by the determined number in descending order of the sum; and wherein, when there is a single peak region in which the sensor output values of both the first electrodes and the second electrodes are equal to or greater than the first threshold value, the arithmetic processing unit calculates the coordinates on the basis of the sensor output values of the plurality of first electrodes and the sensor output values of the plurality of second electrodes.

19. The coordinate detecting device according to claim 18, wherein the first threshold value comprises an ON threshold value and an OFF threshold value and wherein when calculating the coordinates of the detection target, the detection of the peak region is changed according to whether the first threshold value has been in the ON threshold value or the OFF threshold value in a previous detection of the scan.

* * * * *